(12) United States Patent
Uysal et al.

(10) Patent No.: US 12,486,791 B2
(45) Date of Patent: Dec. 2, 2025

(54) EXHAUST-GAS HEATER

(71) Applicant: Purem GmbH, Neunkirchen (DE)

(72) Inventors: Fatih Uysal, Plochingen (DE); Sandra Höckel, Esslingen am Neckar (DE)

(73) Assignee: Purem GmbH, Neunkirchen (DE)

( * ) Notice: Subject to any disclaimer, the term of this patent is extended or adjusted under 35 U.S.C. 154(b) by 362 days.

(21) Appl. No.: 17/929,421

(22) Filed: Sep. 2, 2022

(65) Prior Publication Data

US 2023/0060154 A1 Mar. 2, 2023

(30) Foreign Application Priority Data

Sep. 2, 2021 (DE) ...................... 10 2021 122 681.3

(51) Int. Cl.
*F01N 3/027* (2006.01)
*H05B 3/06* (2006.01)

(52) U.S. Cl.
CPC ............... *F01N 3/027* (2013.01); *H05B 3/06* (2013.01); *F01N 2240/16* (2013.01)

(58) Field of Classification Search
CPC .... F01N 3/027; F01N 2240/16; F01N 3/2013; H05B 3/06
See application file for complete search history.

(56) References Cited

U.S. PATENT DOCUMENTS

| | | | | |
|---|---|---|---|---|
| 4,548,625 A | * | 10/1985 | Ishida | F01N 3/027 60/303 |
| 4,671,058 A | * | 6/1987 | Yoshida | F01N 3/027 219/205 |
| 4,723,973 A | * | 2/1988 | Oyobe | F01N 3/027 60/303 |
| 5,053,603 A | * | 10/1991 | Wagner | H05B 3/76 219/205 |
| 2004/0036044 A1 | | 2/2004 | Hirota | |
| 2017/0218817 A1 | | 8/2017 | Mengelberg | |
| 2017/0254242 A1 | * | 9/2017 | Swanson | G01F 1/86 |
| 2017/0273146 A1 | * | 9/2017 | Everly | H05B 3/16 |
| 2020/0072107 A1 | * | 3/2020 | Aufranc | F01N 3/2013 |
| 2020/0300141 A1 | * | 9/2020 | Gaiser | F01N 13/14 |
| 2021/0156289 A1 | * | 5/2021 | Kurpejovic | F01N 3/2013 |
| 2021/0332730 A1 | * | 10/2021 | Kurpejovic | F01N 3/2013 |

(Continued)

FOREIGN PATENT DOCUMENTS

| | | |
|---|---|---|
| DE | 91 13 928 U1 | 7/1992 |
| DE | 10 2014 115 063 A1 | 4/2016 |
| DE | 10 2019 121 382 A1 | 2/2021 |

(Continued)

*Primary Examiner* — Matthew T Largi (74) *Attorney, Agent, or Firm* — Walter Ottesen, P.A.

(57) ABSTRACT

An exhaust-gas heater for an exhaust-gas system of an internal combustion engine includes a carrier arrangement and a heating-conductor arrangement, which is carried on the carrier arrangement, and which has at least one heating conductor. The carrier arrangement includes an annular first carrier element, which surrounds an exhaust-gas-heater longitudinal axis, and a plurality of second carrier elements, which are formed separately from the first carrier element and are connected to the first carrier element in a first connecting region and to a coupling region of the heating-conductor arrangement in a second connecting region.

17 Claims, 4 Drawing Sheets

(56) References Cited

U.S. PATENT DOCUMENTS

2022/0074333 A1    3/2022   Hoeckel et al.
2022/0290595 A1    9/2022   Uysal et al.

FOREIGN PATENT DOCUMENTS

| | | |
|---|---|---|
| DE | 10 2019 131 556 A1 | 5/2021 |
| DE | 10 2020 123 376 A1 | 3/2022 |
| DE | 10 2021 109 568 A1 | 9/2022 |
| EP | 4 060 169 A1 | 9/2022 |
| FR | 3 085 428 A1 | 3/2020 |
| JP | S58-108217 U | 7/1983 |
| JP | S60-78918 U | 6/1985 |
| JP | 2004-076920 A | 3/2004 |
| JP | 2006-212948 A | 8/2006 |
| WO | 97/13057 A1 | 4/1997 |

\* cited by examiner

EXHAUST-GAS HEATER

CROSS REFERENCE TO RELATED APPLICATION

This application claims priority of German patent application no. 10 2021 122 681.3, filed Sep. 2, 2021, the entire content of which is incorporated herein by reference.

TECHNICAL FIELD

The present disclosure relates to an exhaust-gas heater with which heat can be transferred, in an exhaust-gas system of a motor vehicle, to the exhaust gas flowing therein that has been expelled from an internal combustion engine, in order in this way, in particular in a starting phase of the operation of an internal combustion engine, for system regions arranged downstream of the exhaust-gas heater, such as for example catalytic converters or particle filters, to be brought to operating temperature more quickly.

BACKGROUND

The subsequently published German patent application DE 10 2021 109 568 has disclosed an exhaust-gas heater in which, between two substantially plate-like carrier elements of a carrier arrangement that are constructed from sheet material, two heating conductors of a heating-conductor arrangement that have been provided through cutting-out from a flat material and are of substantially plate-like or areal form are arranged successively in an exhaust-gas main flow direction. The layered construction including carrier elements and heating conductors arranged therebetween is held together by a plurality of bolt-like connecting elements. In order to achieve electrical insulation of the heating conductors with respect to the carrier elements or else with respect to one another, in each case multiple support elements composed of electrically insulating material, for example ceramic material, are arranged between them.

SUMMARY

It is an object of the present disclosure to provide an exhaust-gas heater which ensures that the heating-conductor arrangement is stably held together with the carrier arrangement with improved heat-transfer capacity, in particular at high exhaust-gas temperatures.

According to the disclosure, the object can, for example, be achieved by an exhaust-gas heater for an exhaust-gas system of an internal combustion engine that includes a carrier arrangement and a heating-conductor arrangement which is carried on the carrier arrangement and which has at least one heating conductor, wherein the carrier arrangement includes a ring-like first carrier element, which surrounds an exhaust-gas-heater longitudinal axis, and a plurality of second carrier elements, which are formed separately from the first carrier element and are connected to the first carrier element in a first connecting region and to a coupling region of the heating-conductor arrangement in a second connecting region.

The configuration of the second carrier elements as separate components makes it possible for these to be connected both to the heating-conductor arrangement and to the ring-like first carrier element in a manner in which adaptation to the respectively occurring thermal loads is improved, in order in this way to avoid in particular excessive shielding of the heating-conductor arrangement in the coupling regions in which it interacts in terms of carrying with the carrier arrangement.

Particularly advantageous or preferred here can be a configuration in which the second carrier elements are connected in an electrically insulated manner to the first carrier element in their first connecting region. It is then unnecessary for electrical insulation to be provided between the carrier elements and the heating-conductor arrangement, so that, in coupling regions connected to the second connecting regions, the heating-conductor arrangement is not shielded by the components serving for the electrical insulation.

For example, the second carrier elements may be connected to the first carrier element in their first connecting region via a connecting element, wherein an insulating element is arranged between the first connecting region and the first carrier element, and/or an insulating element is arranged between the first connecting region and the connecting element.

Here, in order to avoid a direct inflow of exhaust gas and consequently to avoid, for the regions in which for example connecting elements of bolt-like construction are used, a loss in the stable interaction in terms of holding due to different thermal expansions, it is proposed that the first carrier element includes, in assignment to at least one, preferably to each, first connecting region, a flow-shielding region, and that the at least one, preferably each, first connecting region is arranged on a flow-off side of the assigned flow-shielding region.

In a configuration that can be realized in a simple and stable manner, the second carrier elements may be connected to the heating-conductor arrangement in their second connecting region by way of material bonding, preferably welding. This avoids any excessive shielding of the heating-conductor arrangement in the region of the second connecting elements. Furthermore, this type of connection contributes to the second connecting elements also being able to be heated by the heating-conductor arrangement and consequently to the surface at which heat is transferred to the exhaust gas flowing around the heating conductor being able to be enlarged.

For stable holding of the heating-conductor arrangement on the carrier arrangement, it is proposed that, in the case of at least one second carrier element in the form of a connecting arm, the first connecting region and the second connecting region are arranged so as to be radially offset in relation to one another and/or do not overlap in a radial direction.

Here, it is possible for example for at least one, preferably each, second carrier element in the form of a connecting arm to be connected to a radially inner coupling region of the heating-conductor arrangement in its second connecting region.

Furthermore, stable holding of the heating-conductor arrangement on the carrier arrangement can be promoted in that, in the case of at least one second carrier element in the form of a connecting clip, the first connecting region and the second connecting region are arranged so as to be substantially not radially offset in relation to one another and/or overlap in a radial direction.

This may be realized in that at least one, preferably each, second carrier element in the form of a connecting clip is connected to a radially outer coupling region of the heating-conductor arrangement.

In order, in this case, to be able to achieve, distributed over the periphery, substantially equal holding action, it is proposed that at least one second carrier element in the form of a connecting clip is provided between at least two second carrier elements in the form of a connecting arm, and/or that at least one second carrier element in the form of a connecting arm is provided between at least two second carrier elements in the form of a connecting clip.

The heating-conductor arrangement may include at least one substantially plate-like heating conductor. Such a plate-like or a really formed heating conductor may be produced for example through cutting-out from a plate-like metal blank. In order to achieve as large a surface area as possible for the thermal interaction with exhaust gas flowing through the exhaust-gas heater, it is proposed that the heating-conductor arrangement includes at least one heating conductor formed with a plurality of meandering winding fields which are arranged successively in a circumferential direction, wherein circumferentially successive meandering winding fields adjoin one another alternately in a radially inner winding-field connecting region and a radially outer winding-field connecting region.

Furthermore, efficient thermal interaction with exhaust gas flowing through the exhaust-gas heater may be achieved in that the heating-conductor arrangement includes two heating conductors which are arranged in an axially successive manner.

In the case of a parallel connection of the heating conductors, in at least one, preferably each, coupling region, provided for connection to a second connecting region, of the heating-conductor arrangement, the at least two heating conductors may be connected to one another preferably in a materially bonded manner.

Here, for stable holding of the heating-conductor arrangement, it may be provided that at least one coupling region of the heating-conductor arrangement is provided at a radially inner winding-field connecting region, and/or in that at least one coupling region of the heating-conductor arrangement is provided at a radially outer winding-field connecting region.

The disclosure also relates to an exhaust-gas system for an internal combustion engine in a vehicle, including at least one exhaust-gas heater constructed according to the disclosure.

BRIEF DESCRIPTION OF THE DRAWINGS

The invention will now be described with reference to the drawings wherein.

DESCRIPTION OF THE PREFERRED EMBODIMENTS

Figure 1:
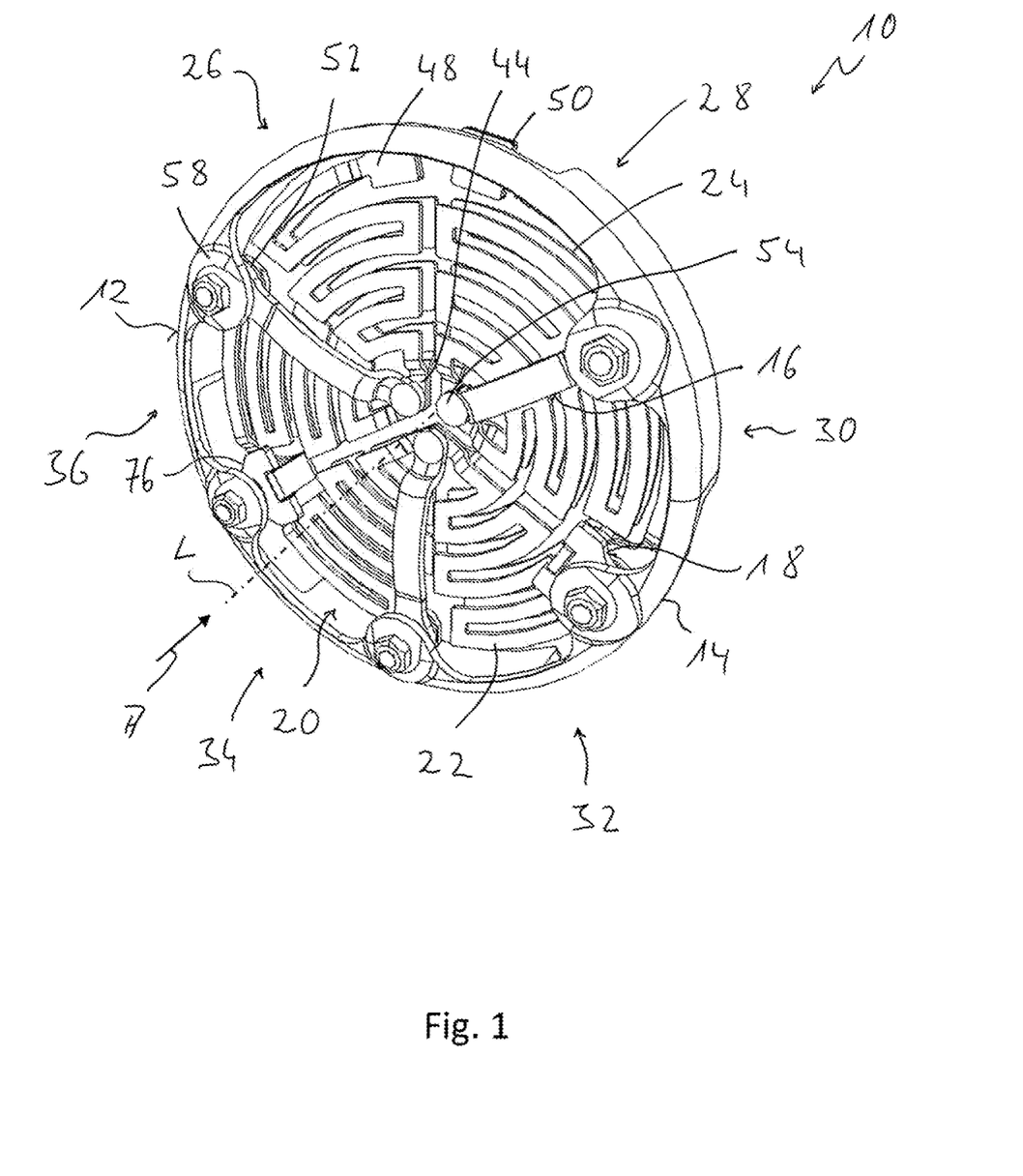
FIG. 1 shows an exhaust-gas heater in a perspective view.
Figure 2:
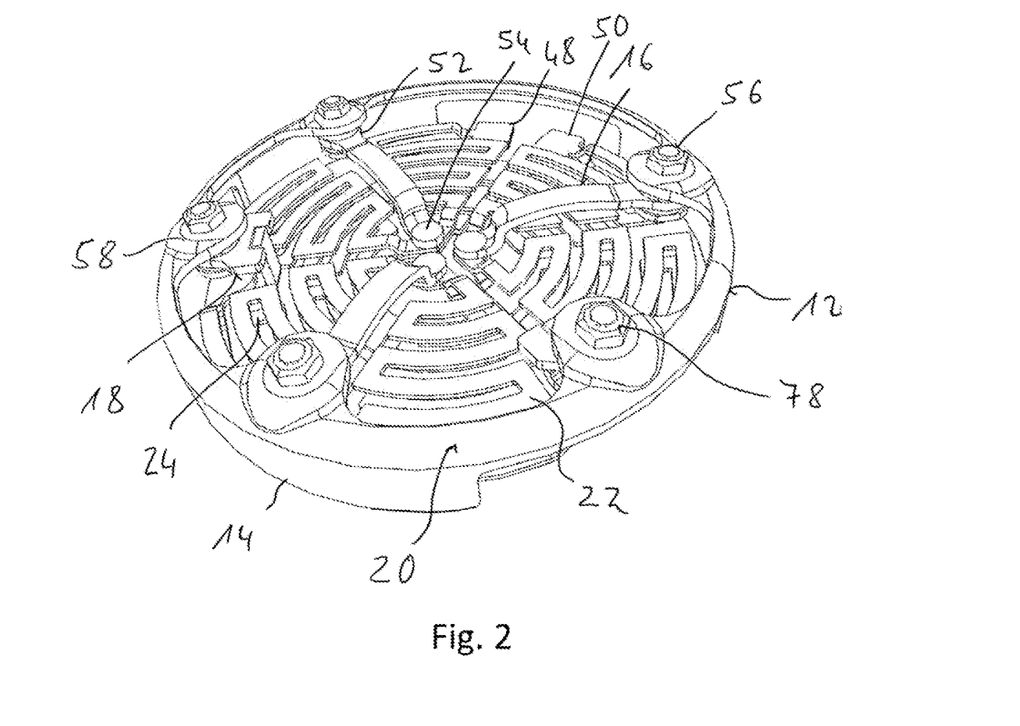
FIG. 2 shows the exhaust-gas heater in FIG. 1 in another perspective view.
Figure 3:
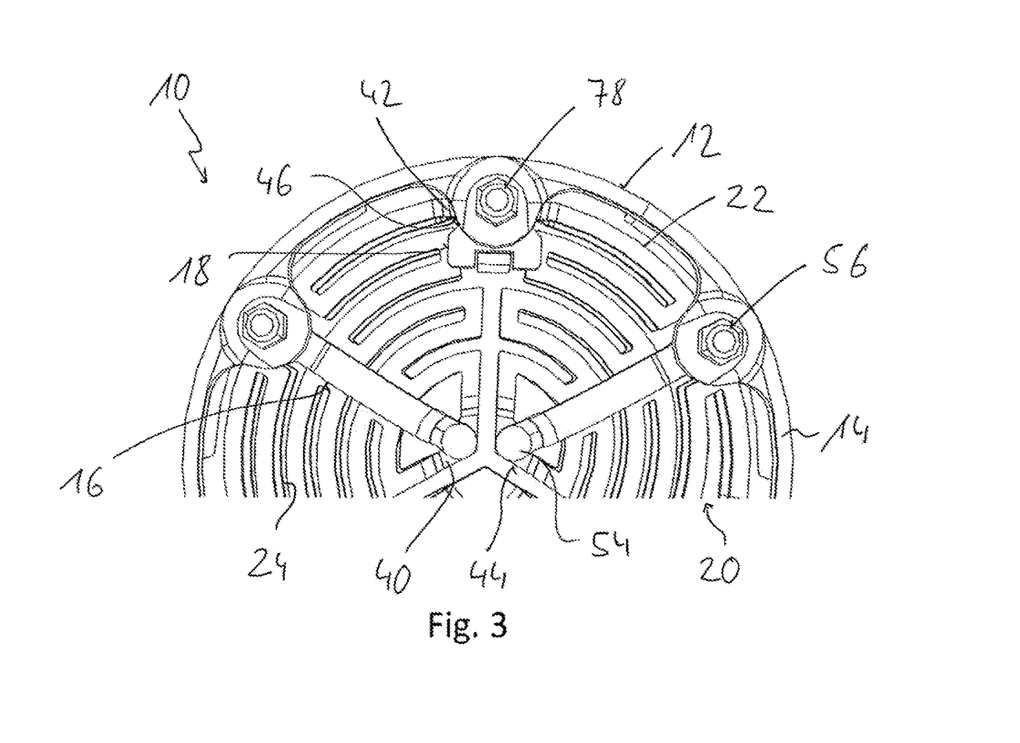
FIG. 3 shows a partial axial view of the exhaust-gas heater in FIGS. 1.

FIGS. 1 to 3 show in a perspective view or in an axial view an exhaust-gas heater (generally denoted by 10) for an exhaust-gas system of an internal combustion engine. The exhaust-gas heater 10 serves for transferring heat to exhaust gas flowing therethrough, in order, in particular in a start phase of the operation of an internal combustion engine, for system regions arranged downstream of the exhaust-gas heater 10, such as for example catalytic converters or particle filters, to be brought to the operating temperature required for the reaction that is to be respectively carried out more quickly by way of the exhaust gas heated at the exhaust-gas heater 10.

The exhaust-gas heater 10 includes a carrier arrangement (generally denoted by 12). The carrier arrangement 12 includes a ring-like first carrier element 14 formed for example from sheet material, which preferably substantially completely surrounds an exhaust-gas-heater longitudinal axis L in a circumferential direction and may thereby have for example a closed ring structure. With accommodation in an exhaust-gas-guiding component of an exhaust-gas system, the exhaust-gas-heater longitudinal axis L is oriented substantially in an exhaust-gas main flow direction A, in which the exhaust gas expelled by an internal combustion engine flows toward the exhaust-gas heater 10.

The carrier arrangement 12 furthermore includes a plurality of second carrier elements 16 in the form of connecting arms and a plurality of second carrier elements 18 in the form of connecting clips. The second carrier elements 16, 18 are for example likewise constructed from sheet material or metal material and are provided as components formed separately from the first carrier element 12.

A heating-conductor arrangement (generally denoted by 20) is carried on the carrier arrangement 12. In the illustrated configuration, the heating-conductor arrangement 20 is constructed with two heating conductors 22, 24 arranged successively in the direction of the exhaust-gas-heater longitudinal axis L, wherein the heating conductor 22 is arranged further upstream than the heating conductor 24.

The two heating conductors 22, 24 have a plate-like structure which is extended substantially orthogonally to the exhaust-gas-heater longitudinal axis L, and are provided for example through cutting-out from a metal-material blank. In order to achieve as large a surface area as possible for the thermal interaction with exhaust gas flowing through the exhaust-gas heater 10, the axially successively arranged heating conductors 22, 24 have a plurality of meandering winding fields 26, 28, 30, 32, 34, 36 which are arranged successively in a circumferential direction. In each of the meandering winding fields 26, 28, 30, 32, 34, 36, the heating conductors 22, 24 have a plurality of meandering winding sections extending substantially in a circumferential direction and situated radially staggered in relation to one another. Meandering winding fields 26, 28, 30, 32, 34, 36 directly adjacent to one another in a circumferential direction are connected to one another alternately in a radially inner winding-field connecting region 40 and a radially outer winding-field connecting region 42, or adjoin one another in the radially inner and radially outer winding-field connecting regions 40, 42.

While the heating conductors 22, 24, with their meandering winding sections, are situated with an axial spacing to one another in the individual meandering winding fields 26, 28, 30, 32, 34, 36, the heating conductors 22, 24 are formed in such a way that, in the radially inner winding-field connecting regions 40 and the radially outer winding-field connecting regions 42, the heating conductors 22, 24 bear against one another in order, in this way, to respectively provide radially inner coupling regions 44 and radially outer coupling regions 46, connected to the carrier arrangement 12, of the heating-conductor arrangement 20, in which the latter is connected to the carrier arrangement 12 or to the second carrier elements 16, 18 thereof.

In the two meandering winding fields 26, 28, which are directly adjacent to one another, the two heating conductors 22, 24, with their radially outermost meandering winding sections, provide in regions thereof connected to one another respective contact elements 48, 50 in which the heating-conductor arrangement 20 can be connected in an electrically conductive manner to a voltage source via respective contact units.

Figure 4:
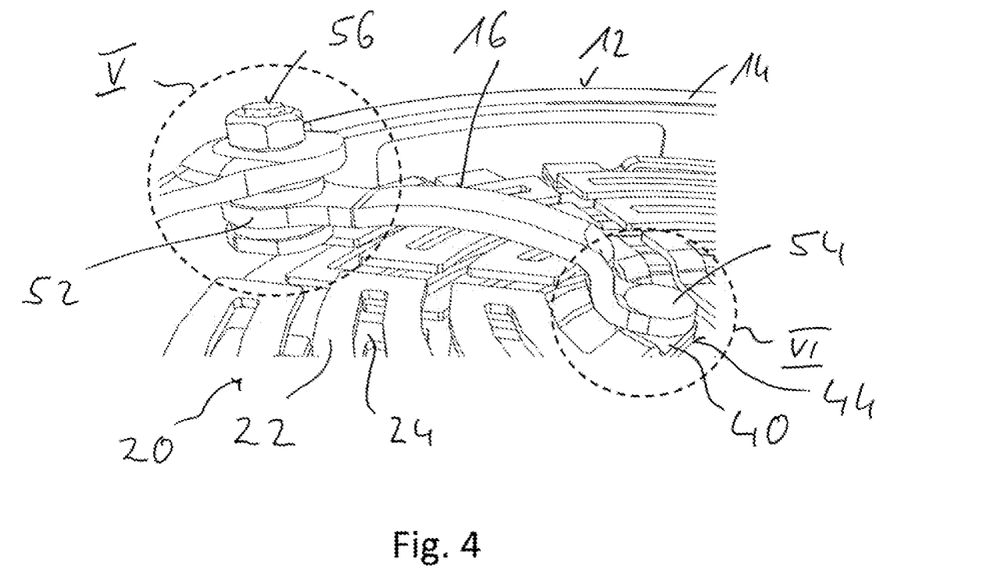
FIG. 4 shows a perspective detail view of the exhaust-gas heater in FIGS. 1 and 2 in the region of a second carrier element in the form of a connecting arm.

FIG. 4 shows a second carrier element 16 in the form of a connecting arm in greater detail. The second carrier element 16 or each second carrier element 16 in the form of a connecting arm extends substantially in a radial direction and provides in its radially outer end region a first connecting region 52 for attachment to the first carrier element 14 of the carrier arrangement 12. In its end region situated radially at the inside, the second carrier element 16 in the form of a connecting arm, which is formed for example from sheet material, provides a second connecting region 54, which is offset radially in relation to the first connecting region 52 and does not overlap the latter in a radial direction or in a circumferential direction and in which the carrier element is connected fixedly to a radially inner coupling region 44 of the heating-conductor arrangement 20. This fixed connection can preferably be realized by way of material bonding, that is, for example welding, wherein, by way of the material bonding, the or each second carrier element 16 in the form of a connecting arm is connected fixedly to both heating conductors 22, 24 in the radially inner winding-field connecting region 40, which provides a respective radially inner coupling region 44. Consequently, in this region of the attachment of the heating-conductor arrangement 20 to the carrier arrangement 12, there is no shielding, in particular no thermal shielding, of the heating-conductor arrangement 20.

In their first connecting regions 52 situated radially at the outside, the second carrier elements 16 in the form of connecting arms are attached to the first carrier element 14 using a respective substantially bolt-like connecting element 56. In assignment to each first connecting region 52, there is formed on the first carrier element 14 a radially inwardly projecting flow-shielding region 58, which is of dome-like form in the upstream direction and substantially completely covers the assigned first connecting region 52 in a circumferential direction and in a radial direction and, due to the fact that it is positioned on the upstream side in relation to the assigned first connecting region 52, shields the latter from the direct inflow of exhaust gas.

Figure 5:
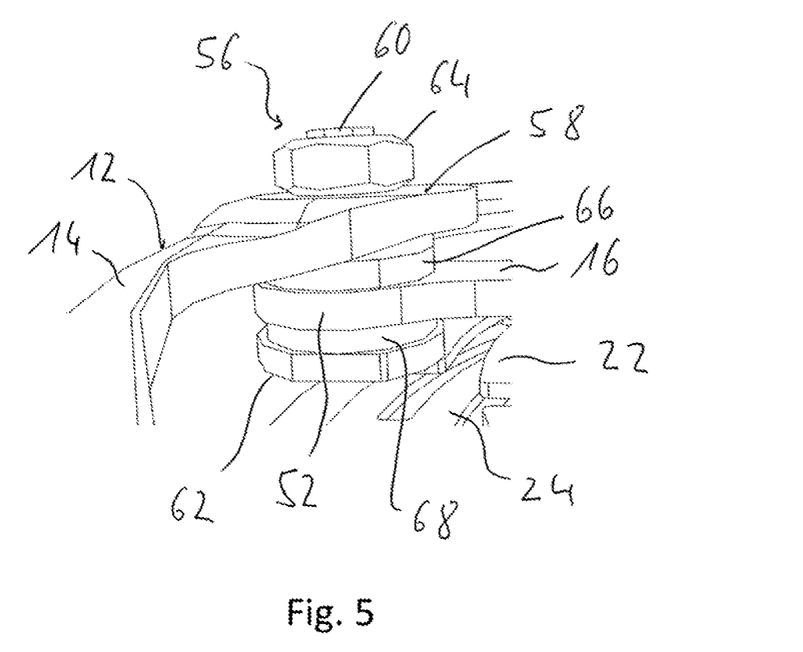
FIG. 5 shows the detail V in FIG. 4 enlarged.
Figure 6:
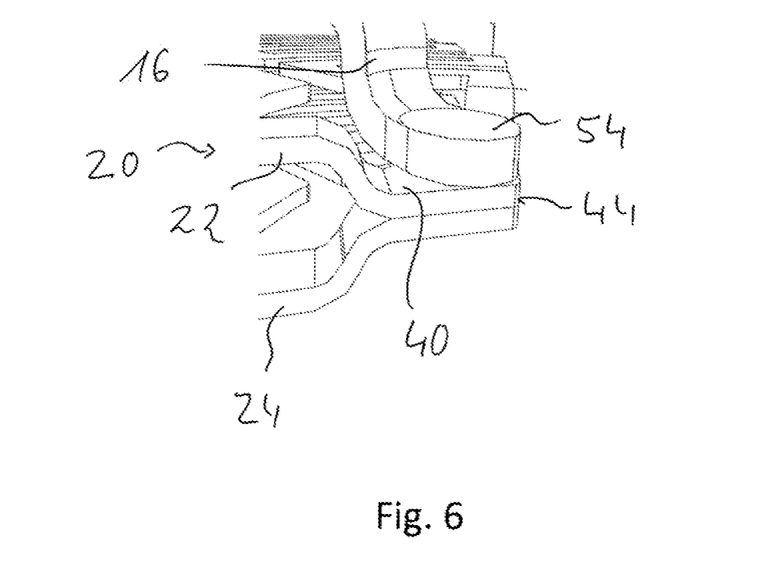
FIG. 6 shows the detail VI in FIG. 4 enlarged.

Each connecting element 56 is formed with a screw bolt having an outer threaded shank 60, having a head 62 and having a nut 64 screwed onto the outer threaded shank 60. In order to achieve electrical insulation of the second carrier elements 16 in the form of connecting arms in their first connecting regions 52, a disk-like insulating element 66, constructed for example with ceramic material, is arranged between each first connecting region 52 and the first carrier element 14 or a flow-shielding region 58 provided thereon. Likewise, an insulating element 68, constructed for example with ceramic material, is arranged between the first connecting region 52 and the head 62 of the assigned connecting element 56. Consequently, each first connecting region 52 is carried on the first carrier element 14 in a stable and electrically insulated manner between the two insulating elements 66, 68 assigned thereto by a respective connecting element 56. Due to the flow-shielding regions 58, it is also the case that the insulating elements 66, 68 and significant regions of a respective connecting element 56 are shielded from the direct inflow of exhaust gas, so that excessive thermal loading does not occur in this region and stable mechanical holding-together of the second carrier elements 16 in the form of connecting arms with the ring-like first carrier element 14 is ensured.

Figure 7:
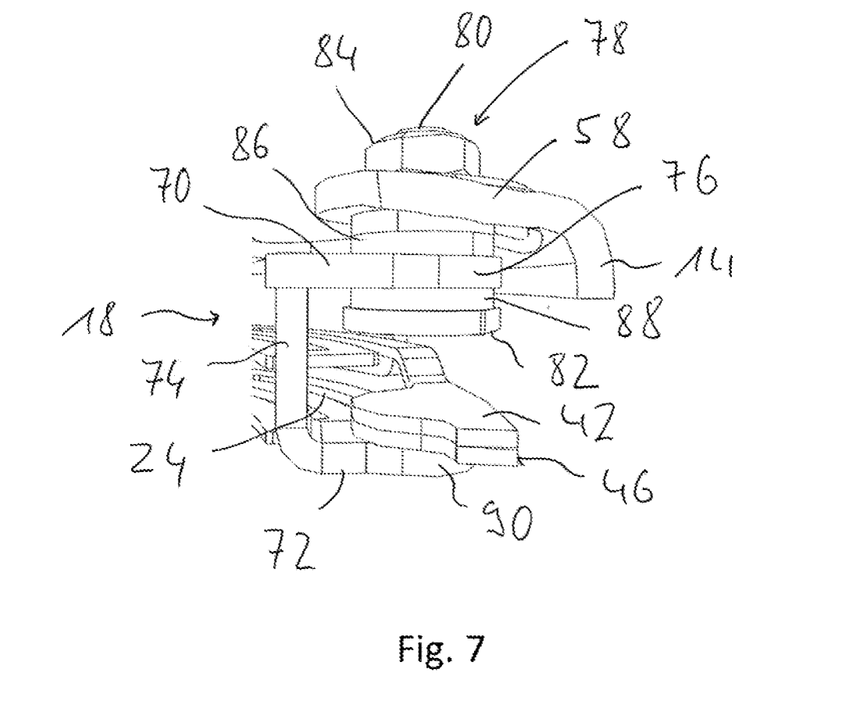
FIG. 7 shows a perspective detail view of the exhaust-gas heater in FIGS. 1 and 2 in the region of a second carrier element in the form of a connecting clip.

FIG. 7 illustrates a second carrier element 18 in the form of a connecting clip in more detail. Each second carrier element 18 in the form of a connecting clip has a substantially U-shaped structure with two U-legs 70, 72 and with a connecting web 74 that connects the U-legs. For example, one of the U-legs 70, 72 may be formed integrally with the connecting web 74 and be connected fixedly to the other U-leg, constructed as a separate component and in the illustrated configuration the U-leg 70, for example by way of material bonding, such as for example welding or the like. A one-piece configuration of the second carrier elements 18 formed with a U-shaped structure, that is, in the form of connecting clips, as formed sheet-metal parts is in principle possible, too.

Formed on the U-leg 70 of the second carrier element 18 is the first connecting region 76 thereof, in which the second carrier element 18 in the form of a connecting clip is connected to the first carrier element 14 by a for example bolt-like connecting element 78. This connecting element 78, too, is constructed with an outer threaded shank 80 and with a head 82 provided thereon and also with a nut 84 screwed onto the outer threaded shank 80. An insulating element 86 is provided between the first connecting region 76 and the assigned flow-shielding region 58 provided on the first carrier element 14. Likewise, an insulating element 88 is provided between the first connecting region 76 and the head 82 of the connecting element 78, so that the first connecting region 76 is carried on the first carrier element 14 in an electrically insulated manner and so as to be substantially shielded from the direct inflow of exhaust gas.

The second connecting region 90 of the second carrier element 18 in the form of a connecting clip, which is arranged in the same radial region as the first connecting region 76 and so as to substantially completely overlap the latter radially and in a circumferential direction, engages, in a radially outer winding-field connecting region 42, which provides a radially outer coupling region 46, behind the two heating conductors 22, 24 of the heating-conductor arrangement 20 on the side thereof which is oriented downstream and, in the radially outer winding-field connecting region, is connected fixedly by way of material bonding, for example welding, to the two heating conductors 22, 24.

It can be seen in FIGS. 1 to 3 that, successively in a circumferential direction, the carrier arrangement 12 includes in each case a second carrier element 16 in the form of a connecting arm with first and second connecting regions 52, 54 that are situated radially offset from one another and do not overlap one another, and a second carrier element 18 in the form of a connecting clip with first and second connecting regions 76, 90 that are substantially not radially offset from one another and overlap one another. This ensures stable mounting of the heating-conductor arrangement 20 in its radially outer region and in its radially inner region in an alternating manner. Furthermore, in the case of this arrangement, the substantially radially extending second carrier elements 16 in the form of connecting arms are arranged in such a way that they are positioned in intermediate spaces formed between two meandering winding fields 26, 28, 30, 32, 34, 36 which are directly adjacent to one another in a circumferential direction, or cover these on the upstream side of the heating-conductor arrangement 20.

Consequently, at least in the regions covered by such second carrier elements 16, a situation in which exhaust gas flows directly through the heating-conductor arrangement 20 without thermal interaction with the heating conductors 22, 24 arising is avoided. Furthermore, the second carrier elements 16, 18 are, by way of the materially bonded attachment, or attachment realized directly and without interposition of insulating elements, to the heating-conductor arrangement 20, in direct thermal contact with the latter, so that, when the heating-conductor arrangement 20 is heated through application of an electrical voltage at the contact elements 48, 50, the second carrier elements 16, 18 are heated too and heat can consequently be transferred to exhaust gas flowing around them.

The present disclosure provides an exhaust-gas heater which has a simple structure and which can be produced with few components and in the case of which the heating conductors, connected in parallel in the illustrated configuration, have substantially no length regions which cannot be flowed against by exhaust gas or cannot be used for heat transfer to exhaust gas. This increases the efficiency of the heat transfer. At the same time, the heating-conductor arrangement is carried in a stable manner on the ring-like first carrier element by way of the various second carrier elements, wherein, owing to the types of connection provided with respect to the heating-conductor arrangement and also with respect to the first carrier element, the risk of different thermal expansions leading to a loss in holding stability is excluded to the greatest extent possible. Contributing to this in particular is the fact that the insulating elements serving for the electrical insulation act not between the second carrier elements and the heating-conductor arrangement but between the second carrier elements and the first carrier element and are consequently not heated directly by the heating line.

Finally, it is pointed out that, in the case of the above-described construction of an exhaust-gas heater, different variations are possible without departing from the principle of the present disclosure. In this regard, it would also be possible for example for the heating-conductor arrangement to have only one such substantially plate-like heating conductor, which for example may be attached to the carrier arrangement in the manner illustrated in the figures. Furthermore, it would be possible for the circumferential sequence of second carrier elements in the form of connecting arms and in the form of connecting clips to be different than that illustrated in the figures. The attachment, provided without interposition of insulating elements, of the second carrier elements to the heating-conductor arrangement could, as an alternative or in addition to the above-described materially bonded connection, also be realized for example by way of bolt-like connecting elements, such as for example rivet bolts.

It is understood that the foregoing description is that of the preferred embodiments of the invention and that various changes and modifications may be made thereto without departing from the spirit and scope of the invention as defined in the appended claims.

What is claimed is:

1. An exhaust-gas heater for an exhaust-gas system of an internal combustion engine, the exhaust-gas heater defining a longitudinal axis (L) and comprising:
    a carrier arrangement;
    a heating-conductor arrangement supported on said carrier arrangement and having at least one heating conductor;
    said carrier arrangement including an annular first carrier element surrounding said longitudinal axis (L) and second carrier elements formed separately from said first carrier element;
    said second carrier elements being connected to said first carrier element in first connecting regions of said second carrier elements; and
    said second carrier elements being connected to a coupling region of said heating-conductor arrangement in second connecting regions of said second carrier elements via material bonding.

2. The exhaust-gas heater of claim 1, wherein said second carrier elements are connected in an electrically insulated manner to said first carrier element in their first connecting regions.

3. The exhaust-gas heater of claim 2, wherein:
    said second carrier elements are connected to said first carrier element in their first connecting regions via a corresponding connecting element; and, wherein at least one of the following applies:
    i) an insulating element is arranged between each one of said first connecting regions and said first carrier element; and,
    ii) an insulating element is arranged between each one of said first connecting regions and the corresponding connecting elements.

4. The exhaust-gas heater of claim 1, wherein said first carrier element comprises flow-shielding regions assigned to corresponding ones of said first connecting regions and defining respective downstream sides; and, said first connecting regions are disposed at corresponding ones of said downstream sides.

5. The exhaust-gas heater of claim 1, wherein said material bonding is welding.

6. The exhaust-gas heater of claim 1, wherein:
    at least one of said second carrier elements is in a form of a connecting arm;
    the first connecting region and the second connecting region of said at least one of said second carrier elements are arranged so as to cause at least one of the following to apply:
    i) said first and second connecting regions of said at least one of said second carrier elements are radially offset; and,
    il) said first and second connecting regions of said at least one of said second carrier elements are not overlapping.

7. The exhaust-gas heater of claim 6, wherein all of said second carrier elements are in a form of a respective connecting arm and are connected to a radially inner coupling region of said heating-conductor arrangement in their second connecting regions.

8. The exhaust-gas heater of claim 1, wherein at least one of said second carrier elements is in a form of a connecting clip; the first connecting region and the second connecting region of said at least one of said second carrier elements are arranged so as to be at least one of the following:
    i) not radially offset in relation to one another; and,
    ii) mutually overlapping in a radial direction.

9. The exhaust-gas heater of claim 8, wherein each one of said second carrier elements in the form of said connecting clip is connected to a radially outer coupling region of said heating-conductor arrangement.

10. The exhaust-gas heater of claim 6, further comprising at least one of the following:

i) at least one of said second carrier elements in a form of a connecting clip is provided between at least two of said second carrier elements in the form of connecting arms; and, ii) at least one of said second carrier elements in the form of the connecting arm is provided between at least two second carrier elements in the form of connecting clips.

11. The exhaust-gas heater of claim 1, wherein at least one of the following applies:

i) said heating-conductor arrangement includes at least one plate-like heating conductor; and, ii) said heating-conductor arrangement includes at least one heating conductor formed with a plurality of meandering winding fields arranged successively in a circumferential direction; and, said meandering winding fields adjoin one another alternately in a radially inner winding-field connecting region and a radially outer winding-field connecting region.

12. The exhaust-gas heater of claim 1, wherein said at least one heating conductor of said heating-conductor arrangement includes a first heating conductor and a second heating conductor, said first and second heating conductors being arranged in an axially successive manner.

13. The exhaust-gas heater of claim 12, wherein there is a plurality of said coupling regions for connection to said second connecting regions of said second carrier elements, said at least two heating conductors being connected to one another at said plurality of said coupling regions.

14. The exhaust-gas heater of claim 13, wherein said at least two heating conductors are connected to one another via material bonding.

15. The exhaust-gas heater of claim 1, wherein at least one of the following applies:

i) said heating-conductor arrangement includes at least one heating conductor formed with a plurality of meandering winding fields arranged successively in a circumferential direction, said meandering winding fields adjoining one another alternately in a radially inner winding-field connecting region and a radially outer winding-field connecting region; and said coupling region of said heating-conductor arrangement is provided at a radially inner winding-field connecting region; and, ii) said heating-conductor arrangement includes at least one heating conductor formed with a plurality of meandering winding fields arranged successively in a circumferential direction, said meandering winding fields adjoining one another alternately in a radially inner winding-field connecting region and a radially outer winding-field connecting region; and said coupling region of said heating-conductor arrangement is provided at a radially outer winding-field connecting region.

16. An exhaust-gas system for an internal combustion engine; the exhaust-gas system comprising:

an exhaust-gas heater defining a longitudinal axis (L) and including:

a carrier arrangement;

a heating-conductor arrangement supported on said carrier arrangement and having at least one heating conductor;

said carrier arrangement including an annular first carrier element surrounding said longitudinal axis (L) and second carrier elements formed separately from said first carrier element;

said second carrier elements being connected to said first carrier element in a first connecting region of said second carrier elements; and said second carrier elements being connected to a coupling region of said heating-conductor arrangement in second connecting regions of said second carrier elements via material bonding.

17. An exhaust-gas heater for an exhaust-gas system of an internal combustion engine, the exhaust-gas heater defining a longitudinal axis (L) and comprising:

a carrier arrangement;

a heating-conductor arrangement supported on said carrier arrangement and having at least one heating conductor;

said carrier arrangement including an annular first carrier element surrounding said longitudinal axis (L) and second carrier elements formed separately from said first carrier element; and, said second carrier elements being connected to said first carrier element in first connecting regions of said second carrier elements;

said second carrier elements being connected to a coupling region of said heating-conductor arrangement in second connecting regions of said second carrier elements;

wherein:

said at least one heating conductor of said heating-conductor arrangement includes a first heating conductor and a second heating conductor, said first and second heating conductors being arranged in an axially successive manner;

there is a plurality of said coupling regions for connection to said second connecting regions of said second carrier elements, said at least two heating conductors being connected to one another at said plurality of said coupling regions via material bonding.

* * * * *